United States Patent Office 3,154,400
Patented Oct. 27, 1964

3,154,400
ALKYL SUBSTITUTED CHLOROACETAMIDE
WEED CONTROL
Philip C. Hamm, Webster Groves, Mo., assignor to
Monsanto Company, a corporation of Delaware
No Drawing. Filed Nov. 15, 1961, Ser. No. 152,679
13 Claims. (Cl. 71—2.7)

This invention relates to new herbicidal compositions and methods for their use. Although the compositions can be used both in contact applications and in pre-emergence procedures, the latter is more significant, since it enables a selective activity on certain grasses without injuring the broad-leaf crop plants.

Many chemical compounds are known to be deleterious to the growth of vegetation and to have herbicidal effects under certain specific conditions; some of these are known to be quite effective at low levels of application. It is, however, a more difficult problem to provide useful herbicides for selective activity on undesirable plants, but which are harmless to other vegetation. Compounds of this type are known, being primarily useful in eliminating broad-leaf plants from grasses or grass-like cereal crops. This herbicidal activity is frequently related to the leaf area exposed to the herbicide, the plants with larger leaf areas being more susceptible to the contact herbicides.

In copending applications of earlier date the present applicants have shown that certain alpha-haloacetamides are excellent herbicides, particularly with respect to grasses. It was demonstrated that alpha-chloroacetamides having short alkyl substituents on the amide nitrogen atom were grass specific but the activity began to fall off when length of the alkyl chain reached six carbon atoms. It was found that with respect to wild oat, brome grass and rye grass the alpha-haloacetamide having alkyl substituents of over six were quite inactive.

It has now been discovered that with respect to crabgrass, foxtail and pigweed control the α-haloacetamide with longer alkyl substituents are very useful, total control being obtained at five pounds per acre and the threshold of significant control being about one pound per acre on most compounds. The control of all grasses is about the same with the α-haloacetamides with n-hexyl substituents, at this length showing activities approaching the point of diminishing returns. Although the wild oat, brome grass and rye grass are only slightly affected by α-haloacetamides with n-heptyl substituents, the pigweed, foxtail and crabgrass are severely inhibited.

It is shown in the table of data hereinafter set forth that the n-heptyl substituted α-haloacetamides have significant activity and the compounds with nitrogen substituents from n-octyl to n-dodecyl are outstanding specific herbicides. The alphachloro-N-tetradecyl is also quite useful but it is apparent that the maximum chain length has been passed and herbicidal effect is falling off.

Relative value of the described compounds was determined by planting greenhouse flats with seeds of the following plants:

A—Wild oat    D—Foxtail
B—Brome grass    E—Crabgrass
C—Rye grass    F—Pigweed

The following table of numerals will be used to designate the relative pre-emergence herbicidal effect of the various haloacetamides:

0—No phytotoxicity
1—Slight pyhtotoxicity
2—Moderate phytotoxicity
3—Severe phytotoxicity The following data was recorded from the observed effects on the emergence of the seedlings:

|  | Rate | A | B | C | D | E | F |
|---|---|---|---|---|---|---|---|
| 2-Chloro-N-*n*-heptyl-acetamide | 15 | 2.5 | 3 | 3 | 3 | 3 | 3 |
|  | 10 | 2 | 0.5 | 3 | 3 | 3 | 3 |
|  | 5 | 0.5 | 0 | 2 | 3 | 1 | 1 |
| 2-Chloro-N-*n*-octyl-acetamide | 15 | 2.5 | 2 | 3 | 3 | 3 | 3 |
|  | 10 | 2 | 1 | 3 | 3 | 3 | 3 |
|  | 5 | 0 | 1.5 | 2 | 3 | 3 | 3 |
| 2-Chloro-N-*n*-nonyl-acetamide | 15 | 3 | 3 | 3 | 3 | 3 | 3 |
|  | 10 | 3 | 3 | 3 | 3 | 3 | 3 |
|  | 5 | 1.5 | 1 | 2 | 3 | 3 | 3 |
| 2-Chloro-N-*n*-decyl-acetamide | 15 | 2 | 1.5 | 3 | 3 | 3 | 3 |
|  | 10 | 2 | 2 | 1 | 3 | 3 | 3 |
|  | 5 | 0 | 0.5 | 0.5 | 3 | 3 | 3 |
| 2-Chloro-N-*n*-undecyl-acetamide | 15 | 2.5 | 1.5 | 3 | 3 | 3 | 3 |
|  | 10 | 2 | 0 | 1 | 3 | 3 | 3 |
|  | 5 | 1.5 | 0.5 | 1 | 3 | 3 | 3 |
| 2-Chloro-N-dodecyl-acetamide | 15 | 0 | 1 | 1 | 3 | 3 | 3 |
|  | 10 | 0.5 | 1 | 1 |  |  |  |
|  | 5 | 0 | 0.5 | 0 | 3 | 3 | 3 |
| α-Chloro-N-tetradecyl-acetamide | 15 | 0 | 1 | 0 | 3 | 3 | 3 |
|  | 10 | 0 | 0 | 0 | 3 | 3 | 2.5 |
|  | 5 | 0 | 1 | 0 | 3 | 3 | 1 |

Valuable herbicidal effects, especially with respect to grasses, will be observed from applications of small amounts, often as low as 0.1 pound per acre as well as at higher concentrations. The selective activity on grasses is more pronounced at lower levels of application, for example from one to 15 pounds per acre.

To obtain the general herbicidal effects, application may be made by spraying the foliage of a growing plant. The selective activity is observed by pre-emergence application by spraying the compound or formulations thereof on the soil surface either prior to or subsequent to the planting of the seed. The preferred method is to plant the seed first and spray the surface with a formulation of the compound which will permeate the top soil layer and destroy the grasses by contact either prior to or subsequent to germination.

These herbicides are not usually applied in neat form, more efficient use being obtained by the use of formulations which include in addition to the alpha-chloroacetamides various conditioning agents which enhance the activity or adapt it for use with conventional machinery for treating plant or soil surfaces.

The solid formulations, frequently referred to as "dusts," may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if they are mixed with the surface soil by means of a disk-plow or harrow at the time of application.

The liquid compositions for herbicidal use may be solutions or other liquid dispersions. The choice of a liquid medium will depend to some extent upon the physical properties of the active ingredient. The N-substituted alpha-haloacetamides may be water-soluble and mere dissolution will then provide a usable formulation. Often the N-substituted alpha-haloacetamides are only limitedly soluble in water and therefore aqueous formulations will necessarily be dispersions of minute drops or solid particles of the water-insoluble substances in suspension in an aqueous medium. The known water-insoluble substituted alpha-haloacetamides of this invention may first be dissolved in a suitable organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid, salts of high molecular weight organic compounds, algin soaps, ethylene oxide, condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefitted by the incorporation of organic solvents for the active components, such as the water-immiscible organic alcohols, ketones and hydrocarbons, for example, isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

The concentrated formulations may be both liquid and solid and may contain from 50 to 98 percent of the active component. In the case of the completely water-soluble herbicides higher percentages or even 100% may be used. However, in most cases a smaller amount of a surface active agent is desirable so that dilution in the field may be facilitated.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component, will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

In addition to the above described herbicide conditioning agents other adjuvants may be added, such as insecticides, fungicides, nematocides and other herbicides. By the use of the subject compounds at the low grass specific levels of application, substantial benefits can be obtained by the addition thereto of a broad-leaf specific herbicide, for example, 2,4-dichlorophenoxyacetic acid and the corresponding esters, amine salts and alkali metal salts, trichlorobenzoic acid and derivatives thereof, such as trichlorobenzyl chloride and trichloro-toluene. In this manner, formulations of efficient and effective use can be provided.

Although the invention is set forth above with respect to specific embodiments, it is not intended that the details thereof should be construed as limitations on the scope of the invention except to the extent incorporated in the following claims.

The embodiments of the invention in which an exclusive property or privilege is claimed are defined as follows:

1. A method of selectively inhibiting the germination and growth of crabgrass, pigweed and foxtail from seeds thereof in contact with the soil which comprises treating the said soil with a herbicidal amount of a compound of the structure $$R-NH-\overset{O}{\underset{\|}{C}}-CH_2X$$

wherein R is an n-alkyl radical having from 8 to 14 carbon atoms and X is a halogen atom of the group consisting of chlorine and bromine.

2. A method of selectively inhibiting the germination and growth of crabgrass from seeds thereof in contact with the soil which comprises treating the said soil with from 0.1 to 15 pounds per acre of a compound of the structure $$R-NH-\overset{O}{\underset{\|}{C}}-CH_2Cl$$

wherein R is an n-alkyl radical having from 8 to 14 carbon atoms.

3. A method of selectively inhibiting the germination and growth of pigweed from seeds thereof in contact with the soil which comprises treating the said soil with from 0.1 to 15 pounds per acre of a compound of the structure $$R-NH-\overset{O}{\underset{\|}{C}}-CH_2Cl$$

wherein R is an n-alkyl radical having from 8 to 14 carbon atoms.

4. A method of selectively inhibiting the germination and growth of foxtail from seeds thereof in contact with the soil which comprises treating the said soil with from 0.1 to 15 pounds per acre of a compound of the structure $$R-NH-\overset{O}{\underset{\|}{C}}-CH_2Cl$$

wherein R is an n-alkyl radical having from 8 to 14 carbon atoms.

5. A method of selectively inhibiting the germination and growth of crabgrass from seeds thereof in contact with the soil which comprises treating the said soil with a herbicidal amount of α-chloro-N-dodecylacetamide.

6. A method of selectively inhibiting the germination and growth of crabgrass from seeds thereof in contact with the soil which comprises treating the said soil with a herbicidal amount of α-chloro-N-decylacetamide.

7. A method of selectively inhibiting the germination and growth of crabgrass from seeds thereof in contact with the soil which comprises treating the said soil with a herbicidal amount of α-chloro-N-nonylacetamide.

8. A method of selectively inhibiting the germination and growth of foxtail from seeds thereof in contact with the soil which comprises treating the said soil with a herbicidal amount of α-chloro-N-dodecylacetamide.

9. A method of selectively inhibiting the germination and growth of foxtail from seeds thereof in contact with the soil which comprises treating the said soil with a herbicidal amount of α-chloro-N-decylacetamide.

10. A method of selectively inhibiting the germination and growth of foxtail from seeds thereof in contact with the soil which comprises treating the said soil with a herbicidal amount of α-chloro-N-nonylacetamide.

11. A method of selectively inhibiting the germination and growth of pigweed from seeds thereof in contact with the soil which comprises treating the said soil with a herbicidal amount of α-chloro-N-dodecylacetamide.

12. A method of selectively inhibiting the germination and growth of pigweed from seeds thereof in contact with the soil which comprises treating the said soil with a herbicidal amount of α-chloro-N-decylacetamide.

13. A method of selectively inhibiting the germination and growth of pigweed from seeds thereof in contact with the soil which comprises treating the said soil with a herbicidal amount of α-chloro-N-nonylacetamide.

References Cited in the file of this patent

UNITED STATES PATENTS 2,973,258     Hamm et al. _____ Feb. 28, 1961

OTHER REFERENCES

Hamm et al.: Agricultural and Food Chemistry, vol. 4, No. 6, June 1956, pages 518 to 522.